United States Patent [19]

Ridings

[11] Patent Number: 4,588,082
[45] Date of Patent: May 13, 1986

[54] CIRCULAR SAWBLADE PACKAGING CASE

[75] Inventor: Jody W. Ridings, Shelby, N.C.

[73] Assignee: Plastic Oddities, Inc., Shelby, N.C.

[21] Appl. No.: 713,551

[22] Filed: Mar. 19, 1985

[51] Int. Cl.$^4$ .............................................. A45C 11/26
[52] U.S. Cl. .................................. 206/349; 206/303; 206/312; 220/94 A
[58] Field of Search ............... 206/303, 309, 310, 312, 206/349; 220/94 A, 339; 294/158, 163; 150/52 B; 190/100

[56] References Cited

U.S. PATENT DOCUMENTS

| | | | |
|---|---|---|---|
| 14,935 | 4/1884 | Rixford | 206/349 |
| 483,991 | 10/1892 | Chase . | |
| 1,500,136 | 7/1924 | Knowlton . | |
| 2,459,460 | 1/1949 | Segal . | |
| 2,501,037 | 3/1950 | Fox | 294/158 |
| 2,546,470 | 3/1951 | Mueller | 206/310 |
| 2,695,210 | 11/1954 | Evans . | |
| 2,988,205 | 6/1961 | Barlow | 206/303 |
| 3,028,986 | 4/1962 | Cushman | 220/94 A |
| 3,053,424 | 9/1962 | Reinhard | 206/303 |
| 3,259,231 | 7/1966 | Romanowski et al. . | |
| 3,261,454 | 7/1966 | Elson et al. . | |
| 3,445,052 | 5/1969 | Lewallen . | |
| 3,547,342 | 12/1970 | Smith | 206/309 |
| 3,870,148 | 3/1975 | Hite | 206/309 |
| 3,907,193 | 9/1975 | Heller | 220/339 |
| 4,124,118 | 11/1978 | Helm | 206/303 |
| 4,159,768 | 7/1979 | Manis et al. | 206/303 |

Primary Examiner—Joseph Man-Fu Moy
Assistant Examiner—David Fidei
Attorney, Agent, or Firm—Laurence R. Brown

[57] ABSTRACT

This invention provides a portable carrying case for circular sawblades useful for packaging display and permanent storage of the blade by the end user. The case is inexpensively formed from a single sheet of plastic to form therein two hinge lines defining a pair of cover panels separated by a base panel, forming a book-like casing for storing the sawblades on a stub extending inwardly from one cover panel. A plastic manually deformable latch locks the two covers closed in place over the sawblades, until access is desired. A carrying handle extends from one cover edge for transport while the cover panels are latched in closed position.

1 Claim, 4 Drawing Figures

CIRCULAR SAWBLADE PACKAGING CASE

TECHNICAL FIELD

This invention relates to circular saw blade holders, and more particularly it relates to inexpensive packaging cases for circular sawblades serving as permanent carrying cases.

BACKGROUND ART

It has been customary in the art to protect and store circular sawblades in accessible packing cases of various sorts. U.S. Pat. Nos. J. Chase, 483,991 Oct. 11, 1892; H. N. Knowlton, 1,500,136, July 8, 1924; and A. R. Segal, 2,459,460, Jan. 18, 1949 all are directed to packing cases with a blade encasing indentation about a central post location for mating through the central blade hole. H. J. Romanowski et al, U.S. Pat. No. 3,259,231, July 5, 1966 shows a plastic display and storage casing for circular saw blades having two frictionally interfitting transparent plastic circular discs with a central hub for positioning in the sawblade hole and adapted to hang on a rod for display by a circumferentially extending hook.

Storage inside portable boxes or tool chests is provided by J. Evans, U.S. Pat. No. 2,695,210, Nov. 23, 1954 and D. E. Elson et al, U.S. Pat. No. 3,261,454, July 19, 1966. In some of this art the blades are secured by dimensioning of the storage cavities to space two opposing case members to contact both sides of a single blade of known thickness. In others fastening means such as a bolt hub for extending through the blade hole with a nut disposed on one side of the blade for clamping the sawblade against a single supporting casing surface. The Elson patent suspends the blades away from any supporting surface by means of a resiliently compressible hub member through the blade hole which is compressed by a manually operable wing nut.

All of this art fully recognizes the need to carefully handle a circular saw blade both to protect the saw from damage and in a way that does not encourage injury to persons handling the saw. Some of the art recognizes the need for safely storing the sawblade in transport. Only Romanowski et al recognizes the need for an inexpensive casing which can be used in a store for display and thereafter used by the purchaser as a protective carrying case from which the sawblade may be repeatedly taken for use after purchase.

There are however deficiencies in this art, which are resolved by the present invention, such as those now discussed. Metal saw blades in thin plastic portable casings with two or more pieces frictionally fit together can be dangerous if impacted such as by dropping because of the relatively heavy sawblade and its relatively sharp and rugged construction which can cause dislodgment. Friction fitting of two plastic discs in registration with a sawblade is also a source of potential danger. Furthermore, if one piece of a two piece casing becomes damaged or inoperable to interfit properly, or is lost, the sawblade storage problem is acute.

Because of the weight of a sawblade and the nature of conventional storage casings, it is not easily carried away from a point of purchase by a customer. If put into a conventional paper bag, it can tear the bag and fall out particularly if the bag becomes wet. Thus a storage package that is readily carried has not been made available by the prior art.

Not many of the prior art casings are adaptable to storage of more than one circular sawblade, or of sawblades of differing sizes and thicknesses. Neither are any of them of a construction that may be economically manufactured with enough quality to serve as a permanent portable carrying case for circular sawblades, providing easy access, safe and reliable storage even under rough handling, and difficult to render unusable.

This invention therefore has as its objective to provide an improved circular sawblade portable carrying case, which overcomes the problems of the prior art and affords features not heretofore available in tahe prior art.

DISCLOSURE OF THE INVENTION

An inexpensive one piece plastic circular sawblade packaging case is provided by this invention economically feasible for use in shipping or for in-store display of circular saw blades yet rugged and reliable enough for permanent storage of one or more sawblades in a readily accessible condition for ready use. Thus a plastic sheet is formed with living hinges therein at two places to form two cover panels with a base stand therebetween. The base stand may be wide enough to permit the case to stand on a table or the floor with a blade therein with the cover panels substantially vertical. A carrying handle is formed along at least one of the sheet edges opposite to the base panel.

Centrally located in one of the cover panels is a saw mounting stub or post extending toward the other cover panel adapted to receive a fastening member thereon, such as a nut, so that the sawblade hole is registered thereover and the sawblade can be positioned and held against the inside cover panel surface.

Manually actuable fastening-unfastening means comprising mating resiliently deformable members on the upper edges of the cover panels near the handle hold the covers latched together for storage and carrying. By manual pressure the resilient latching members may be unlatched for access to the internally stored sawblades. One piece integral construction of a semi-flexible thermoplastic such as polypropylene provides ruggedness, durability, economy, light weight and ready portability, and permits the unit to be constructed without losable parts or extra hardware fittings except for a single fastening member for mating on the mounting stub.

THE PREFERRED EMBODIMENT

Figure 1:
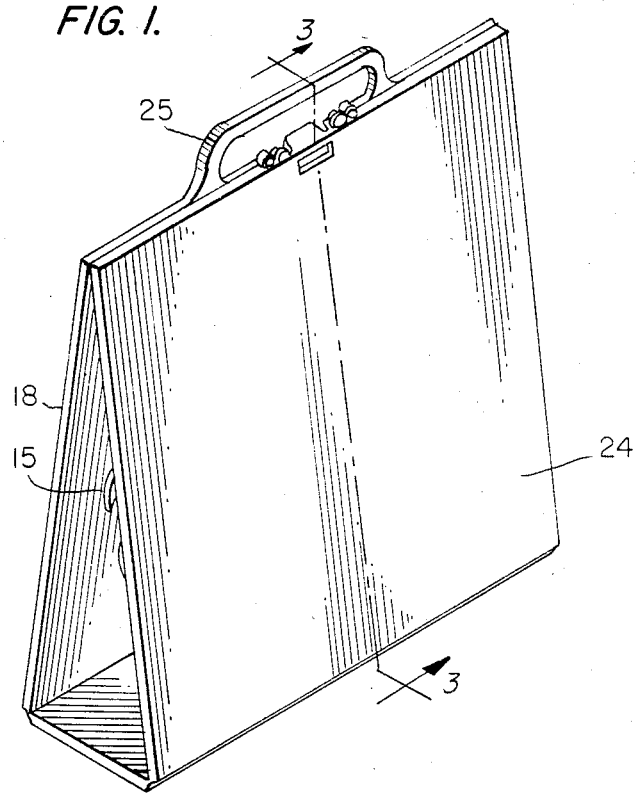
FIG. 1 is a perspective view of a one piece plastic circular sawblade packaging case afforded by a preferred embodiment of the invention shown with cover panels closed for safely storing the sawblade.

As may be seen from the drawings, the circular sawblade 15 has its central hole mated over the stud 16, which is adapted to receive a suitable fastener, in this embodiment a nut (not shown) for mating with the screw threads of stud 16. Thus the blade 15 is held in place parallel to and adjacent the inner surface 17 of cover panel 18. More than one sawblade may be stacked on the stud 16, if desirable, spaced by washers.

Figure 2:
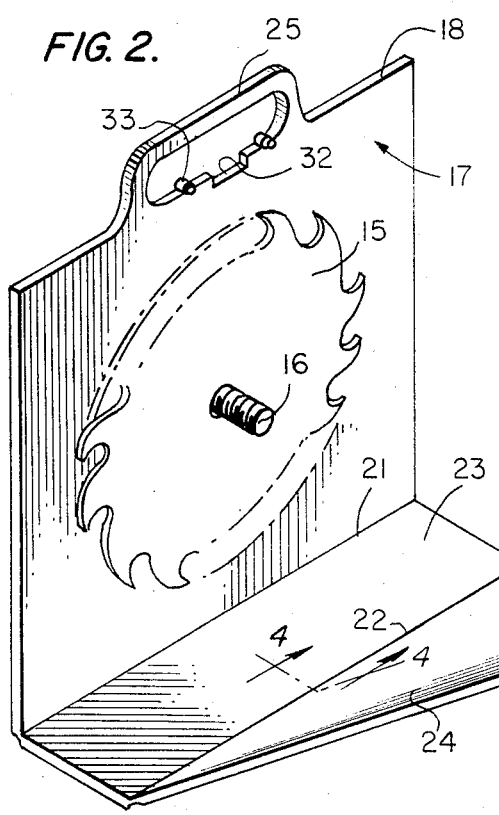
FIG. 2 is a perspective view of the case with covers opened in a display or access position showing the sawblade in storage position against one cover panel surface.
Figure 3:
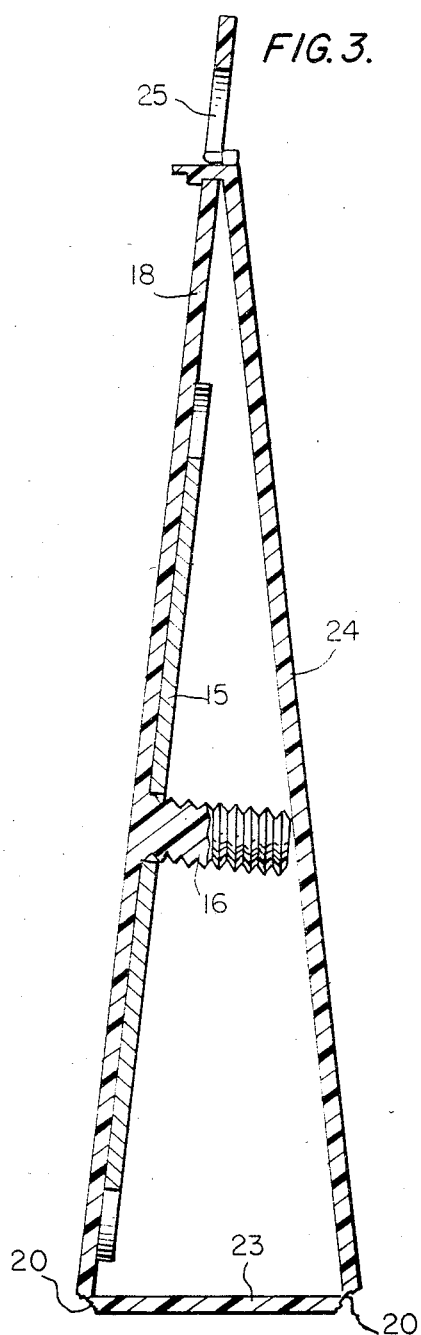
FIG. 3 is an end view, partly in section, taken along lines 3—3 of FIG. 1.
Figure 4:
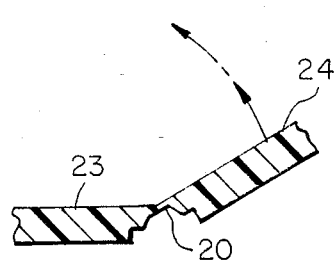
FIG. 4 is a fragmental section view showing the living hinge construction as formed in the single plastic sheet forming the entire case in this preferred embodiment.

As best seen from FIG. 2, the packaging and carrying case of this invention in its preferred embodiment is formed from a single sheet of plastic, such as thermoplastic polypropylene. Thus, as detailed in FIG. 4, an integral plastic hinge of the type known as a living hinge may be formed in the single plastic sheet. Such hinges are described for example in U.S. Pat. No. 3,445,052 to J. V. Lewallen, May 20, 1969. The single sheet is thus hinged at two places, 21 and 22 to form two cover panels, 18 and 24, with a base stand panel 23 therebetween. The sheet may then be folded about hinges 21 and 22 to dispose the cover panels 18 and 24 upwardly from the base panel 23 to form a closed protective casing about the sawblades as shown in FIG. 1. The hinge structure of FIG. 4 accordingly shows a preference for upswing of the cover panels from the base panel 23.

The width of the base panel 23 may be varied, but as shown, is suitable for standing the case, when holding one or more sawblades, on a floor or table in stable position with the integral carrying handle 25 upright. If desirable to stack the cases ikn less storage space, the base panel can be narrower.

In a plastic one piece integral case, the stud 16 is molded in place in the center of one cover panel 18 in a direction facing the other cover panel 24, and for particular saw lines may be made of a diameter to mate snugly with the sawblade central hole.

Resiliently deformable plastic latching members 30, 31 on one cover panel 24 and mating members 32, 33 on the other cover panel 18 form manually actuable fastening-unfastening means, which are preferably designed to snap closed automatically into the latched position when the top edges of the two cover panels 18 and 24 as seen in FIG. 1 are brought together manually. Thus tab 30 will slip over notch 32 and detent in place concurrently with the alignment of bosses 31, 33 in detented engagement. The case is simply opened by manual pressure to deform the tab 30 upwardly out of notch 32 to force the top edges of cover panels 18 and 24 apart. Preferably also by heat treatment or otherwise, the hinges 20 given a preferred memory condition to tend to hold the cover panels 18 and 24 substantially perpendicular to the base panel 23. Thus the latching members are molded plastic parts extending in a single direction from the basic single sheet format to provide the unitized integral single piece plastic case and package. The plastic sheet is typically 0.012 in. (0.03 cm.) thick.

Most important, the handle structure 25 formed into the case by shaping the basic single sheet format, provides a comfortable and safe manner of transporting the sawblades from a point of purchase and storing them until they are used.

Having therefore provided a new article of manufacture advancing the state of the art, those features of novelty believed descriptive of the spirit and nature of the invention are defined with particularity in the following claims.

I claim:

1. A one piece safe and inexpensive circular sawblade packaging and carrying case, comprising in combination, a one piece plastic sheet comprising substantially the entire carrying case for circular sawblades hinged by living hinges at two places to form two equal length side cover panels extending from a base stand panel forming an isosceles triangle connected therebetween upon which the case when containing a sawblade will rest with the cover panels extending generally upwardly therefrom and forming a storage compartment for encompassing circular sawblades, a circular saw mounting post integrally extending inwardly into the storage compartment from one of said cover panel side walls towards the other for engaging the center hole of circular sawblades about the post to hold at least one circular sawblade adjacent to and parallel with said side cover panel, manually actuatable fastening means at the free ends of each side cover panel defining resiliently deformable mating latch members integrally formed with said side cover panel free ends for holding the two side cover panels together to define a closed protective casing about a circular sawblade held between said covers, and a carrying handle integrally extending from one of said side cover panels at the free end positioned at the apex of the isosceles triangle formed by said base and equal side cover panels positioned remote from said base.

* * * * *